United States Patent
Van Aken et al.

(10) Patent No.: US 6,559,944 B1
(45) Date of Patent: May 6, 2003

(54) METHOD FOR MAINTAINING UNIFORMITY AMONG COLOR MEASURING INSTRUMENTS

(75) Inventors: Harold R. Van Aken, Wallkill, NY (US); Ronald G. Anderson, Lawrenceville, NJ (US)

(73) Assignee: GretagMacbeth, LLC, New Windsor, NY (US)

( * ) Notice: Subject to any disclaimer, the term of this patent is extended or adjusted under 35 U.S.C. 154(b) by 0 days.

(21) Appl. No.: 09/484,558

(22) Filed: Jan. 18, 2000

Related U.S. Application Data (63) Continuation of application No. 09/113,662, filed on Jul. 10, 1998, now Pat. No. 6,043,894.

(51) Int. Cl.$^7$ ................................................ G01J 3/46
(52) U.S. Cl. ...................................... 356/425; 356/402
(58) Field of Search ................................ 356/425, 402; 382/162, 165, 166, 167; 702/85; 700/250

(56) References Cited

U.S. PATENT DOCUMENTS

| | | |
|---|---|---|
| 4,812,904 A | 3/1989 | Maring et al. |
| 5,680,327 A | 10/1997 | Cook et al. |
| 5,774,230 A | 6/1998 | Goto |

FOREIGN PATENT DOCUMENTS

| | | |
|---|---|---|
| FR | 2685769 A | 7/1993 |
| FR | 2698982 A | 6/1994 |

Primary Examiner—Zandra Smith
(74) Attorney, Agent, or Firm—Cummings & Lockwood (57) ABSTRACT

A method for maintaining substantial reliability of color measurements obtained by a number of color measuring instruments includes by measuring color values of a set of master color standards on a master color measuring instrument at a master color lab, and measuring color values of sets of working color standards on the same instrument to determine calibration values. The working sets are provided to remote locations for use on remote color measuring instruments and the working sets are measured on the remote color measuring instruments to obtain color value measurements which are transmitted to the master color lab. The measurements from the remote instruments are compared with the calibration values obtained from measurements on the master instrument to generate profiles which are provided to the remote color labs. The profiles are applied to measured color values for the set of working color standards to obtain corrected color values. These values are transmitted to the master color lab and analyzed to determine compliance with specifications as to permissible deviations.

37 Claims, 6 Drawing Sheets

Project-Microsoft Visual Basic (run) - [FORM 1 (CODE)]

File  Edit  View  Project  Format  Debug  Run  Tools  Shape  Add-ins  Window  Help

COMMAND 4    ▶  CLICK    ▶

COLOR INFORMATION MANAGEMENT SYSTEM

WORK LIST: STL27 02-24-1998 23:11:12 75.3
PROFILE: TEXT 2

COMM PORT: 1
CE-7000
AVERAGE

SERIAL NO.: 1
CERTIFICATE

MASTER COLOR LAB (UNCORRECTED)   COLOR LAB (CORRECTED)   NEW PROFILE (CORRECTED)

| STD NAME | STANDARD | L | A | B | DL | DA | DB | DE | DL | DA | DB | DE | DL | DA | DB | DE |
|---|---|---|---|---|---|---|---|---|---|---|---|---|---|---|---|---|
|  | WHITE | 95.96 | -0.59 | 1.66 |  |  |  |  |  |  |  |  |  |  |  |  |
|  | GREY | 58.49 | -0.23 | 0.01 |  |  |  |  |  |  |  |  |  |  |  |  |
|  | DK GREY | 35.51 | -0.26 | 0.23 |  |  |  |  |  |  |  |  |  |  |  |  |
|  | YELLOW | 85.14 | -6.27 | 77.64 |  |  |  |  |  |  |  |  |  |  |  |  |
|  | GREEN | 56.42 | 30.24 | 13.07 |  |  |  |  |  |  |  |  |  |  |  |  |
|  | BLUE | 53.96 | -9.53 | 30.07 |  |  |  |  |  |  |  |  |  |  |  |  |

PROJECT - PROJECT 1

COLOR STNRDS LAB

COLOR STANDARD LAB

CE-7000
CALIBRATE    END

WORKING STANDARD LIST
START    6
PATH: \\LCU\NC\CIMS\
NAME: SWL000

PROFILE GENERATION
START    EXPIRE
PATH: \\LCU\CC\CIMS\
NAME: TSWL000
PROFILE: XL0878

NAME: SWL27

STD WORK LIST RETRIEVED

START | WEB S... | INBOX | MICROS | FIND FIL... | PROJECT | NETWORK | COLOR... | COLOR... | COLOR I... | 2:04 PM

METHOD FOR MAINTAINING UNIFORMITY AMONG COLOR MEASURING INSTRUMENTS

CROSS-REFERENCE TO RELATED APPLICATIONS

The present application is a continuation application and claims the priority benefits of U.S. patent application, Ser. No. 09/113,662 filed Jul. 10, 1998 entitled "Method for Maintaining Uniformity Among Color Measuring Instruments," now U.S. Pat. No. 6,043,894 to Van Aken et al.

BACKGROUND OF THE INVENTION

The present invention is directed to color measurement and, more particularly, to a method for establishing accuracy and consistency in the measurement of color measuring instruments located at a number of facilities.

Color measuring instruments are widely employed to determine whether the color of various articles being produced meets the specifications for the desired color of that product. Sometimes different manufacturers, and/or different locations of the same manufacturer, may be producing parts which are intended to have the same color so that they will match when assembled. Moreover, replacement parts should also have the same color as the originally produced parts.

If all production were to be measured by the same color measuring instrument, and assuming that the color measuring instrument were properly maintained and serviced, there would be no significant problem in ensuring that the measurement results are consistent for that instrument since it can be periodically checked using a set of color standards.

However, when production is taking place at a multiplicity of locations employing different instruments and even instruments of different manufacturers, consistency in measurements from instrument to instrument is unlikely, and, in fact, it is likely that there will be substantial deviation in the results which would be obtained from measurement of the same part on the different instruments. Unfortunately, there is even variation between sets of color standards used to measure the performance or calibrate the instruments. Some color measuring instruments tend to exhibit drift in the measurements which they will generate over a period of time. Obviously, if a manufacturer cannot be assured that all of the parts it is making which are intended to have the same color values can be tested to determine that they do so, there would be a need to match parts of the same color coming from different sources.

Accordingly, it is an object of the present invention to provide a novel method for establishing management control over a series of color measuring instruments at remote locations to ensure that the measurements obtained by use of different instruments are accurate and related.

It is also an object to provide such a method in which the individual facilities making parts can certify to the customer that the parts produced meet the color specifications established for the part.

Another object is to provide such a method in which a master color lab can maintain supervisory control over the measurement techniques and instruments being employed at a multiplicity of locations and provide corrective action.

SUMMARY OF THE INVENTION

It has now been found that the foregoing and related objects may be readily attained in a method for maintaining substantial reliability of color measurements generated by a number of color measuring instruments and thereby confirming the substantial uniformity of color of products produced at several facilities. Color values of a set of master color standards are measured on a master color measuring instrument at a master color lab, and thereafter color values of sets of working color standards are measured on the master color measuring instrument to determine calibration values based upon the deviations in values determined for the working set from the values determined for the set of master color standards. The sets of working color standards are provided to remote locations for use on remote color measuring instruments. The remote locations measure the sets of working color standards to obtain color value measurements which are transmitted to the master color lab.

The master color lab compares the measurements from the remote color measuring instruments with the calibration values obtained from measurements on the master color measuring instrument for that respective set of working color standards to generate remote instrument measurement profiles reflecting the variations in measurements attributable to each of the remote color measuring instruments. These remote instrument measurement profiles are provided to the remote color labs which measure color values for their sets of working color standards and apply the remote instrument measurement profiles to the measured color values to provide corrected color values which are transmitted to the master color lab. The corrected color values are analyzed to determine compliance with specifications as to permissible deviations.

In operation, the remote color measuring instruments are used to measure color values of articles to determine compliance with color specifications for the articles and to certify those articles which comply with the color specifications as being within the color specifications.

Periodically, the sets of working standards are remeasured on the remote measurement instruments and the remeasured color values are transmitted to the master color lab which analyzes the remeasured color values to determine that the instruments are in compliance with specifications as to permissible deviations. Desirably, the steps of comparing and analyzing are performed by computers, and the transmitting steps are performed by electronic transmission. The periodic remeasurement and analysis steps are performed at regular intervals.

In this manner, remote color measurement instruments located at a multiplicity of remote locations communicate with a computer at the master color lab, and the several steps are performed with respect to each of the remote measurement instruments to provide uniform color testing at the multiplicity of locations.

DETAILED DESCRIPTION OF THE PREFERRED EMBODIMENT

In accordance with the present invention, a master color laboratory is responsible for maintaining uniformity of color measurement activity by a series of measurement laboratories at remote locations. Color standards will be utilized by the master color lab and the various remote laboratories to provide the bases for controlled measurements and generation of instrument profiles as will be described more fully hereinafter. The computers at the master color laboratory and at the several remote color laboratories are connected through a dedicated network or through the Internet.

Figure 1:
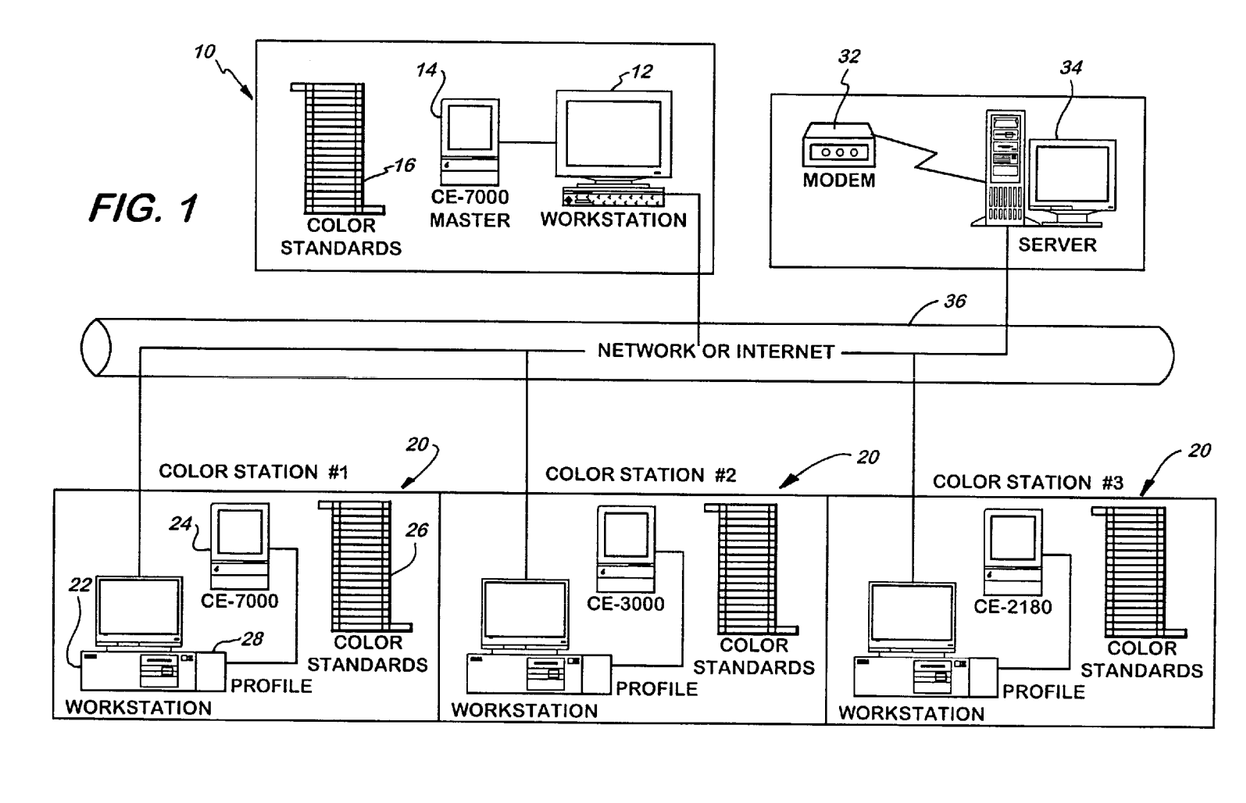
FIG. 1 is a diagrammatic representation of a color measurement management system in accordance with the method of the present invention.

Turning first to FIG. 1, the master color laboratory generally designated by the numeral 10 has a computer work station 12, a master color measuring instrument 14, and a master set of color standards 16.

The several remote color measuring laboratories are generally designated by the numeral 20 and each has a computer work station 22, a color measuring instrument 24 and a working set of color standards 26. Also provided for use in the computer work station 22 is an instrument profile designated by the numeral 28.

Modem connections 32 to a server 34 are employed in instances when there is a dedicated network. If not, communication between the master lab 10 and the remote color stations 20 can be effected through the Internet, both designated by the numeral 36.

Figure 2A:
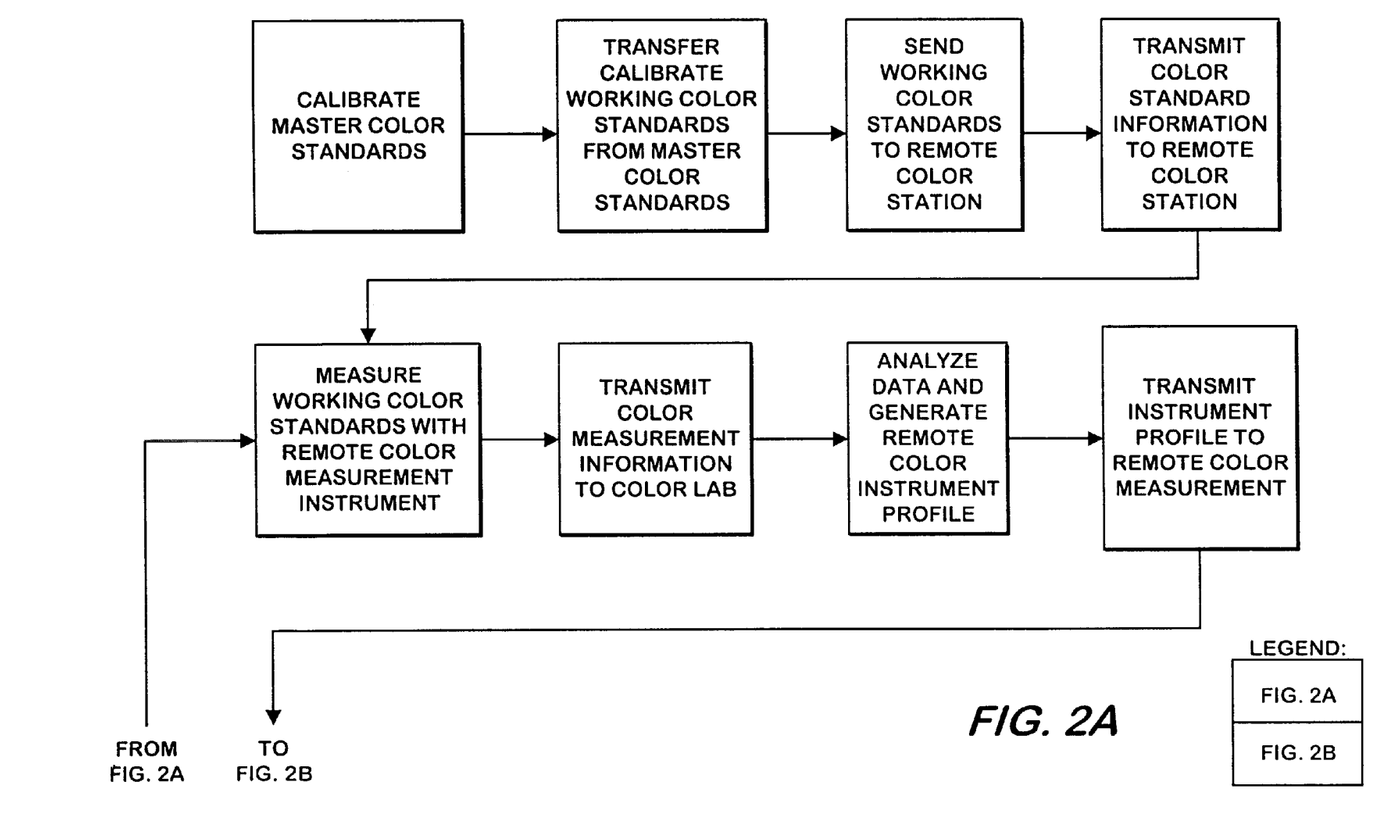
FIGS. 2a and 2b depict is a flow chart showing the steps in the practice of the method of the present invention.
Figure 2B:
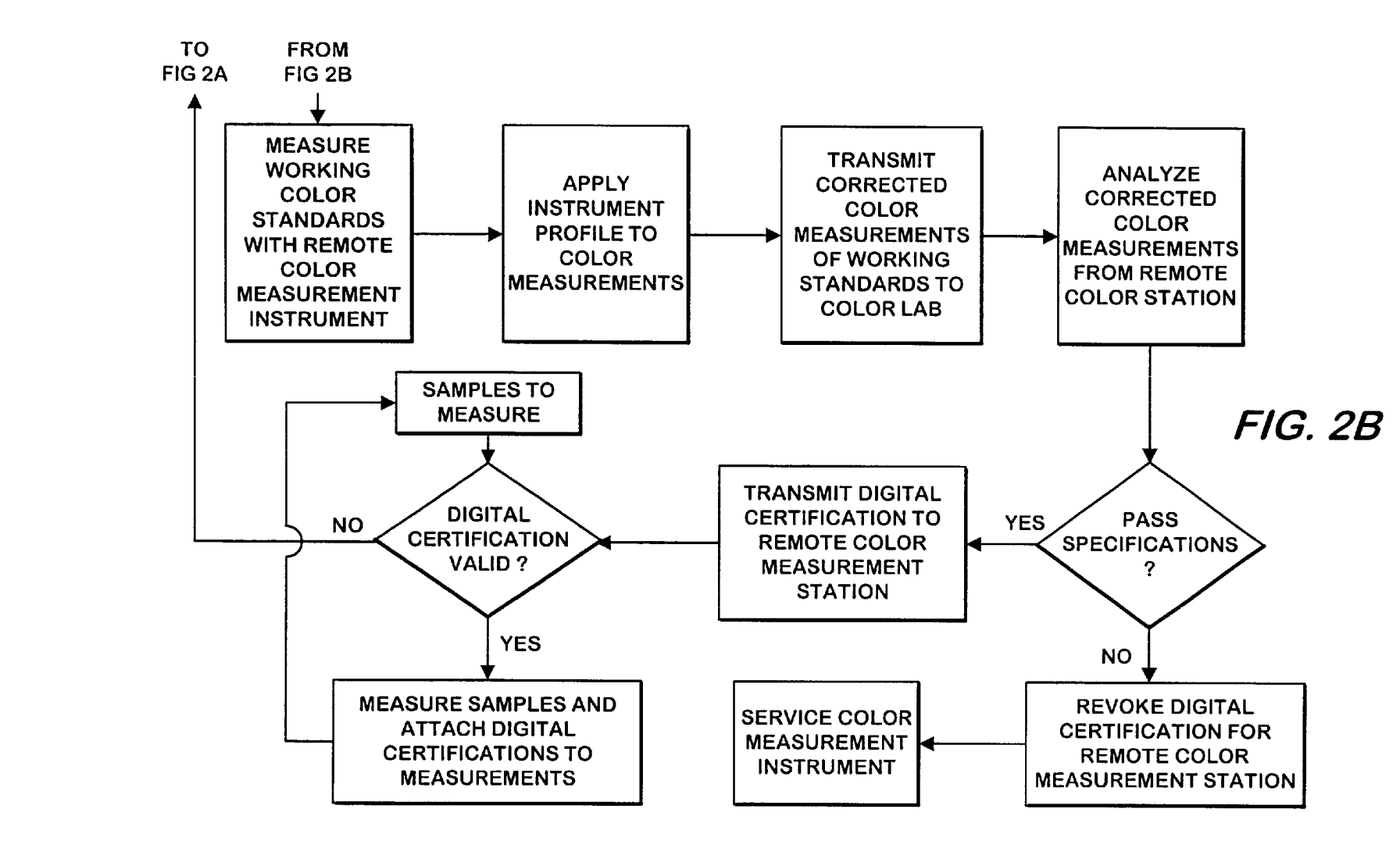

Turning next to FIGS. 2a and 2b, the steps in the process are shown therein. The master color lab 10 first calibrates its master color measurement instrument utilizing a master set of color standards, and it thereafter measures working sets of color standards to determine deviations of each set from the set of master color standards.

The sets of working color standards are then sent to the various remote color stations 20 which measure the working sets of color standards on their own instruments and transmit the color measurement data to the master color lab. Utilizing the information which was developed by its measurement of the working set of color standards and the color measurements obtained by the remote color lab, the master color lab generates a color instrument profile which provides corrections to be applied to measurements made by the remote color instrument and this profile is transmitted to the remote color measurement laboratory.

The working set of color standards is remeasured on the instrument and the instrument profile is applied to the measurements which are obtained. The corrected color measurements on the working set of standards are transmitted to the master color lab which analyzes the color measurements which it received to determine whether the instrument is within the specifications established for permissible deviation. If so, the remote color laboratory is advised that this instrument is performing satisfactorily with the profile which was transmitted.

The color laboratory at the remote location can now measure the color of products being produced at that facility to determine whether they meet the color specifications established for those products and certify those products which do.

If the master color lab determines that deviation of the corrected color measurements received from a remote color lab exceed the amount of deviation which is permissible, it revokes the certification of the performance of that instrument and requires a repeat of the process to generate a new instrument profile until such time as the instrument generates corrected results within the appropriate specification.

The process of generation of an instrument profile starts in the Color Standards Lab as seen in FIG. 1. A series of standards is selected such as an abridged set of BCRA standards: White, Gray, Dark Gray, Green, Yellow and Blue. The master set of standards is calibrated by a standardizing agency such as NPL or NIST which reports full reflectance values. An alternative method is to measure the Master Standards on the Master Spectrophotometer.

The next step is to transfer a calibrated working set of color standards that will be used at the remote color lab. Standard calibration methods are used in a wavelength by wavelength case using the master color measurement spectrophotometer: working assigned=master assigned (working measured/master measured).

Figure 3:
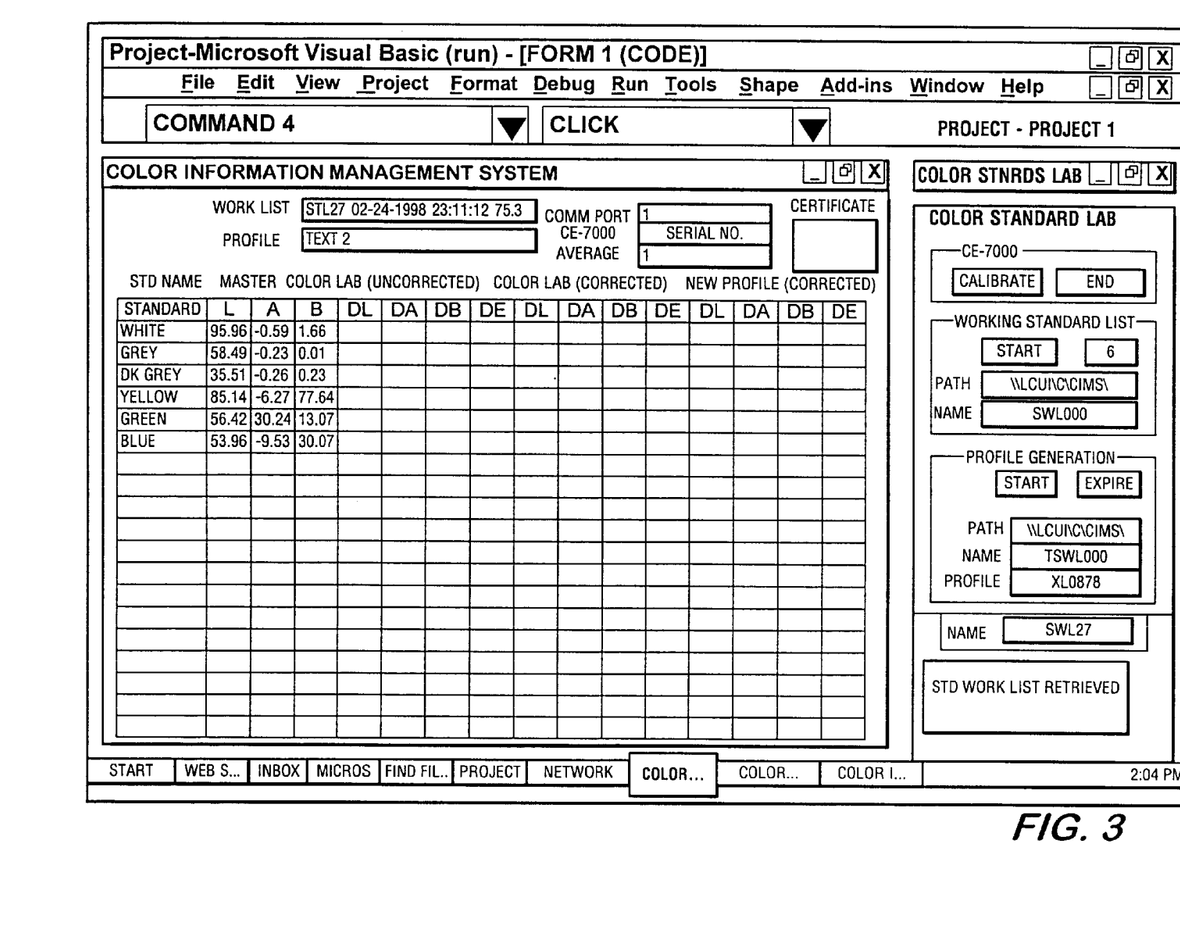
FIG. 3 is a computer screen showing the color values measured by the master color lab for a working set of color standards.

The working set of color standards is then sent to the remote color measurement lab, and the measurement data obtained by the master color measurement instrument is archived for profile generation. The computer screen for the profile generation software at the master lab might look similar to FIG. 3 in which the standards are named and the color values shown.

Figure 4:
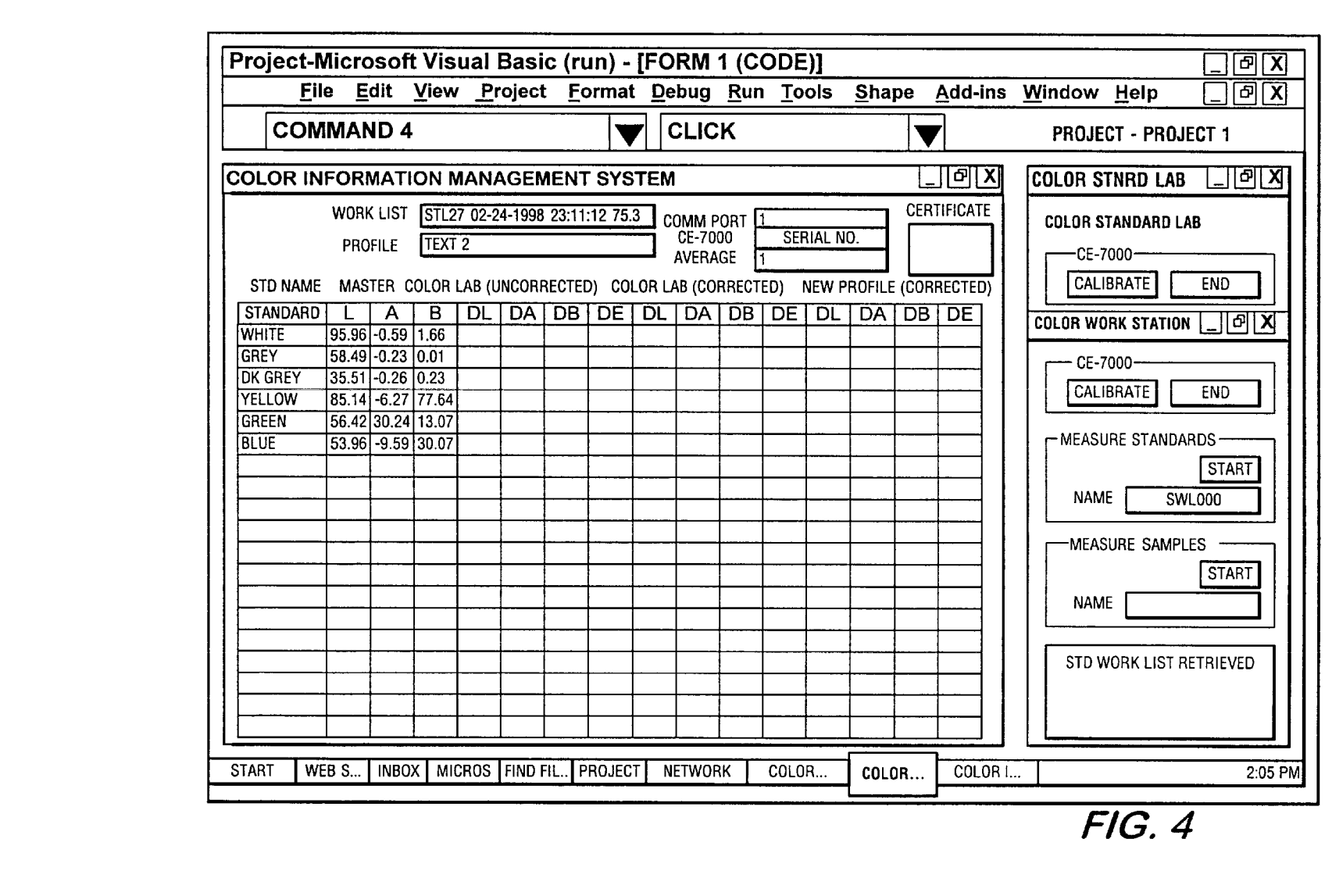
FIG. 4 is a computer screen at the remote location.

The next step in the process of profile generation is at the remote workstation. After the working set of color standards has been received, the computer contacts the master color lab by a local network or the Internet and downloads a work list with the color standard names, values and instructions. The working set of color standards is measured on the remote color measurement instrument and the results transmitted over the network to the master color lab. The computer screen using the software to control the color measurements at the remote color workstation is shown in FIG. 4.

Figure 5:
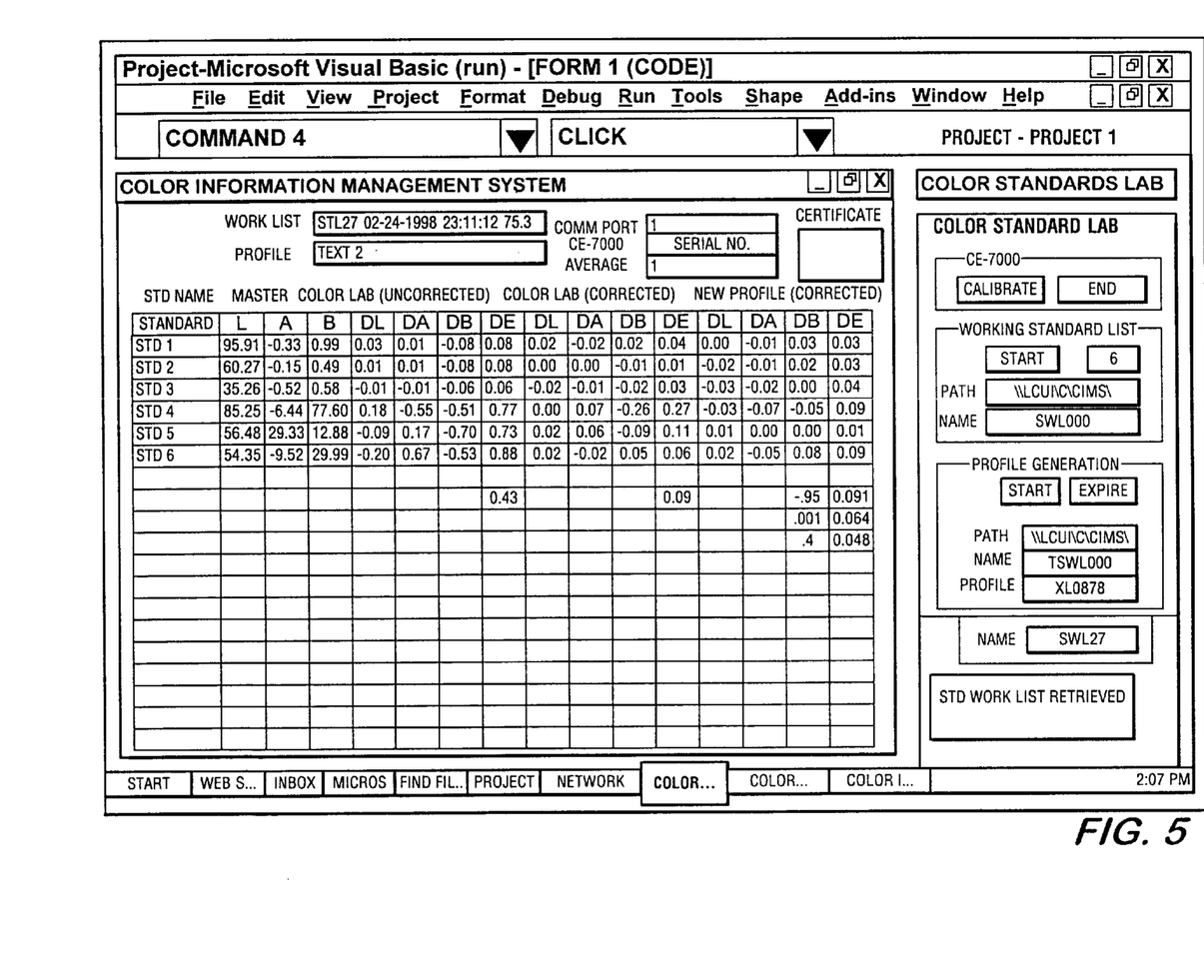
FIG. 5 is a computer screen showing a profile determined by the master color lab for correction of color measurements taken on an instrument at a remote location.

When the color measurement data from the remote instrument has been received by the master color lab, a series of calculations and optimizations takes place as indicated on the computer screen shown in FIG. 5.

1. The first information displayed is the uncorrected remote color measurements compared to the transfer calibrated values of the working set of color standards. These are shown in FIG. 5 under the columns of "Master" and "Color Lab uncorrected". The results in this case show that the average difference between the measurements at the master color lab and the results at the remote lab is 0.43 DE. The next column labeled Color Lab (Corrected) shows the measurements using the current profile that the remote instrument is using. In this case, the previous profile had reduced the difference to 0.09 DE average. If a profile was never generated the results in this column would be the same as the "Color Lab uncorrected".

2. The next step is to correct the white calibration differences using the white standard measured and assigned values. This will create a multiplier factor for each wavelength called kmul where kmul=assigned/measured. All measured values for all standards are now multiplied by these kmul factors to correct for any calibration differences.

3. The next step is a linearity correction using a power correction. The values of the grey standard are compared to the assigned values and are corrected by the method: corrected=uncorrected^ klin. The power correction factor is generated using a power correction called klin=assigned/measured. All values corrected in step 2 are now linearity corrected by this equation: corrected=uncorrected^ kmul.

4. Yet another step is wavelength correction. Each wavelength value is shifted by a small amount using an interpolation method and tested for better agreement with the assigned values. When the minimum is reached, the interpolation factor kwave is used to correct the results of step 3. Corrected=(r−1)*kwave+ r*(1−kwave) for a linear interpolation. However, other methods may also be used.

Other corrections may be applied such as (a) dispersion which is a non-linear shift of the wavelength scale, (b) black correction (open port), (c) stray light and (d) other subtle factors depending on the differences of the master instrument and the remote instrument. The results are shown in FIG. 5 under new profile as 0.048 DE avg. This is an order of magnitude improvement from the original uncorrected values.

At this point after the results have been found to meet predetermined requirements, a profile is generated using the constants determined in steps 1–4. This profile is then transmitted over the network to the remote work station where the profile will then be used to correct every reflectance value in the same manner as in steps 1–4 of the profile generation at the master color lab.

The set of working color standards is then measured at the remote color workstation, and the results are transmitted to the master color lab. If the measurements corrected by the profile are evaluated and found to be within predetermined limits, the master color lab will issue a "digital certificate" over the network which can be included with all subsequent color measurements to provide assurance of conformity to predetermined color tolerances as certified by the master color lab.

Although colorimeters may be utilized as color measurement instruments, spectrophotometers are preferred because they are more accurate and less likely to exhibit drift. The method of the present invention adapts itself to the instruments of various manufacturers because of the technique of utilizing the central color laboratory to test the working sets of color standards to be used at the remote sites with the varying types of instruments.

Typically, such color measurements will include Lab data for at least six color standards, and preferably 12 colors plus white in accordance with BCRA standards. The standard employed should be highly stable to enable long term use.

The method of the present invention is not limited to internal operations within a single company having a central laboratory and a number of laboratories at remote manufacturing locations. A single master laboratory can service a number of manufacturers, and even the laboratories at facilities of subcontractors using the Internet.

It should be readily appreciated that the central laboratory is not certifying that the parts being produced by any particular facility meet the specifications for the color of the product established therefor, but, rather that the instruments which are being utilized to conduct the measurements are performing within certified tolerances. These tolerances can be established on a customer-by-customer basis or by an industry standard.

Moreover, different companies or manufacturers which utilize this service may provide that the certification will automatically be revoked after a specified period of time to ensure that the remote laboratory performs the recertification process on a timely basis. Ideally, instruments would be retested at the beginning of each workday, but ideally such recertification should take place at least on a weekly basis.

Thus, it can be seen from the foregoing detailed description and attached drawings that the method of the present invention permits control over and certification as to the accuracy of the measurements being obtained on various instruments at remote locations. In turn this enables uniformity of evaluation of the same color on products being produced at different locations. The method does not require expensive additional equipment and is easily adapted to various testing facilities and industries.

Having thus described the invention, what is claimed is:

1. A method for maintaining reliability among color measuring instruments comprising:

a) measuring color values of a first set of color standards and a second set of color standards on a first color measuring instrument to determine calibration values for the second set of color standards based upon the deviation between the color values determined for the first set of color standards and the color values determined for the second set of color standards;

b) measuring the second set of color standards on a second color measuring instrument to obtain color measurement values therefor;

c) comparing the color measurement values obtained by the second color measuring instrument with the calibration values obtained by the first color measuring instrument to generate a profile for the second color measuring instrument reflecting the variations in measurements attributable to the second color measuring instrument;

d) applying the profile to the measured color values obtained by the second color measuring instrument for the second set of color standards to provide corrected color values; and    e) determining compliance with specifications as to permissible deviations based upon the corrected color values.

2. A method for maintaining reliability among color measuring instruments according to claim 1, further comprising the step of measuring color values of articles on the second color measuring instrument and applying the profile to determine compliance with color specifications for the articles.

3. A method for maintaining reliability among color measuring instruments according to claim 2, further comprising the step of certifying articles complying with the color specifications as being within the color specifications.

4. A method for maintaining reliability among color measuring instruments comprising:

a) measuring color values of a set of master color standards and a set of working color standards on a first color measuring instrument at a first location to determine calibration values for the working color standards based upon the deviation between the color values determined for the working color standards and the color values determined for the master color standards;

b) measuring the set of working color standards on a second color measuring instrument at a second location to obtain color measurement values therefor;

c) comparing, at the first location, the color measurement values obtained by the second color measuring instrument with the calibration values obtained by the first color measuring instrument to generate a profile for the second color measuring instrument reflecting the variations in measurements attributable to the second color measuring instrument;

d) applying, at the second location, the profile to the measured color values obtained by the second color measuring instrument for the set of working color standards to provide corrected color values; and    e) determining, at the first location, compliance with specifications as to permissible deviations based upon the corrected color values.

5. A method for maintaining reliability among color measuring instruments according to claim 4, further comprising the step of measuring color values of articles on the second color measuring instrument and applying the profile to determine compliance with color specifications for the articles.

6. A method for maintaining reliability among color measuring instruments according to claim 5, further comprising the step of certifying articles complying with the color specifications as being within the color specifications.

7. A method for maintaining reliability among col or measuring instruments according to claim 4, further comprising the step of transmitting the color measurement values obtained by measuring the set of working color standards on the second color measuring instrument from the second location to the first location.

8. A method for maintaining reliability among color measuring instruments according to claim 4, further comprising the step of transmitting the profile from the first location to the second location.

9. A method for maintaining reliability among color measuring instruments according to claim 4, further comprising the step of transmitting the corrected color values from the second location to the first location.

10. A method for maintaining reliability among color measuring instruments comprising:
  a) measuring color values of a set of master color standards and a set of working color standards on a first color measuring instrument at a master color lab to determine calibration values for the working color standards based upon the deviation between the color values determined for the working color standards and the color values determined for the master color standards;
  b) measuring the set of working color standards on a second color measuring instrument at a remote color lab to obtain color measurement values therefor;
  c) comparing, at the master color lab, the color measurement values obtained by the second color measuring instrument with the calibration values obtained by the first color measuring instrument to generate a profile for the second color measuring instrument reflecting the variations in measurements attributable to the second color measuring instrument;
  d) applying, at the remote color lab, the profile to the measured color values obtained by the second color measuring instrument for the set of working color standards to provide corrected color values; and
  e) determining, at the master color lab, compliance with specifications as to permissible deviations based upon the corrected color values.

11. A method for maintaining reliability among color measuring instruments according to claim 10, further comprising the step of measuring color values of articles on the second color measuring instrument and applying the profile to determine compliance with color specifications for the articles.

12. A method for maintaining reliability among color measuring instruments according to claim 10, further comprising the step of certifying articles complying with the color specifications as being within the color specifications.

13. A method for maintaining reliability among color measuring instruments according to claim 10, further comprising the step of transmitting the color measurement values obtained by measuring the set of working color standards on the second color measuring instrument from the remote color lab to the master color lab.

14. A method for maintaining reliability among color measuring instruments according to claim 10, further comprising the step of transmitting the profile from the first master color lab to the remote color lab.

15. A method for maintaining reliability among color measuring instruments according to claim 10, further comprising the step of transmitting the corrected color values from the remote color lab to the master color lab.

16. A method for maintaining reliability among color measuring instruments according to claim 8, wherein the transmission of the profile from the first location to the second location is effected through a dedicated network or through the Internet.

17. A method for maintaining reliability among color measuring instruments according to claim 9, wherein the transmission of the profile from the second location to the first location is effected through a dedicated network or through the Internet.

18. A method for maintaining reliability among color measuring instruments according to claim 4, wherein said second location is remote from said first location.

19. A method for maintaining reliability among color measuring instruments according to claim 4, further comprising calibrating said first color measuring instrument based on said measurement of color values of said set of master color standards.

20. A method for maintaining reliability among color measuring instruments according to claim 4, further comprising the step of revoking a certification of a color measuring instrument at a second location based on non-compliance with specifications as to permissible deviations.

21. A method for maintaining reliability among color measuring instruments according to claim 20, further comprising repeating method steps (a) through (e) for said color measuring instrument at said second location in response to said revocation of said certification of said color measuring instrument.

22. A method for maintaining reliability among color measuring instruments according to claim 4, wherein said set of master color standards is calibrated by a standardizing agency.

23. A method for maintaining reliability among color measuring instruments according to claim 4, wherein the measured color values at the first location are archived.

24. A method for maintaining reliability among color measuring instruments according to claim 23, wherein the measured color values are archived by a master color measurement instrument at the first location.

25. A method for maintaining reliability among color measuring instruments according to claim 4, further comprising the step of downloading a work list from said first location to said second location.

26. A method for maintaining reliability among color measuring instruments according to claim 26, wherein said work list includes color standard names, values and instructions.

27. A method for maintaining reliability among color measuring instruments according to claim 4, wherein said profile includes factors for correction of white calibration, linearity, wavelength, dispersion, black correction, stray light and combinations thereof.

28. A method for maintaining reliability among color measuring instruments according to claim 6, further comprising the step of transmitting a digital certificate from said first location to said second location based on a determination of compliance with specifications as to permissible deviations, and wherein said step of certifying articles includes associated said digital certificate with articles measured at said second location.

29. A method for maintaining reliability among color measuring instruments according to claim 4, wherein the color measuring instruments are selected from the group consisting of colorimeters and spectrophotometers.

30. A method for maintaining reliability among color measuring instruments according to claim 29, wherein said color measuring instruments are manufactured by different instrument manufacturers.

31. A method for maintaining reliability among color measuring instruments according to claim 4, wherein said color measurements are made in accordance with a BCRA standard.

32. A method for maintaining reliability among color measuring instruments according to claim 4, wherein said first and second locations constitute operations of a single company.

33. A method for maintaining reliability among color measuring instruments according to claim 4, wherein said first location constitutes a master laboratory and said second location constitutes a third party manufacturer or subcontractor.

34. A method for maintaining reliability among color measuring instruments according to claim 4, wherein the specifications as to permissible deviations are established on a customer-by-customer basis.

35. A method for maintaining reliability among color measuring instruments according to claim 4, wherein the specifications as to permissible deviations are established on an industry-wide basis.

36. A method for maintaining reliability among color measuring instruments according to claim 4, wherein method steps (a) through (e) are performed on a predetermined periodic basis.

37. A method for maintaining reliability among color measuring instruments according to claim 36, wherein said predetermined periodic basis is established by a user of said method.

* * * * *